May 3, 1938.  B. McINNERNEY  2,115,995
HYDRAULIC BRAKE
Filed Sept. 30, 1937
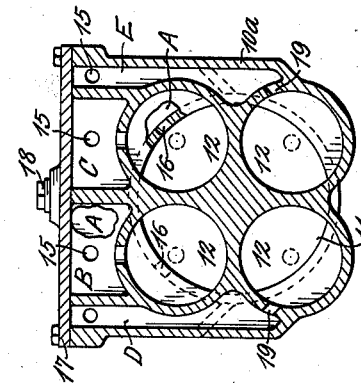
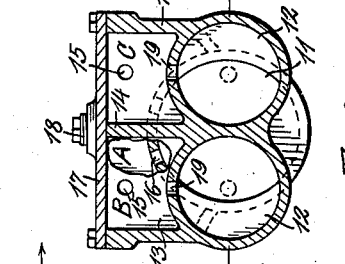
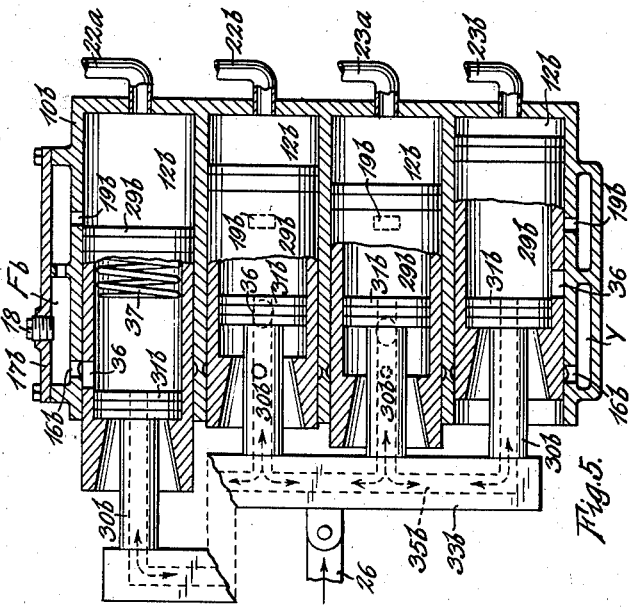
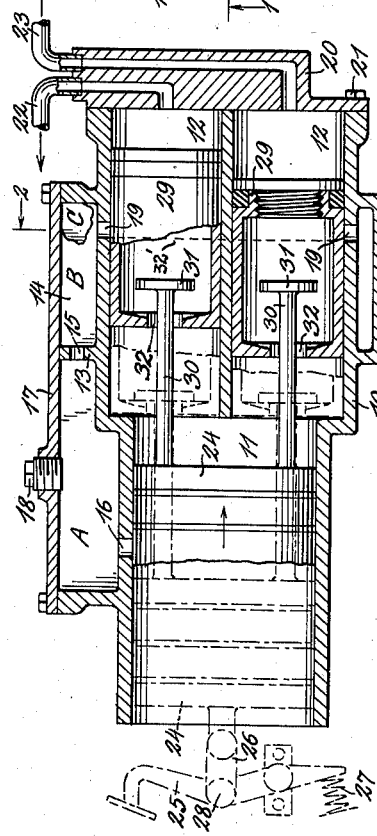
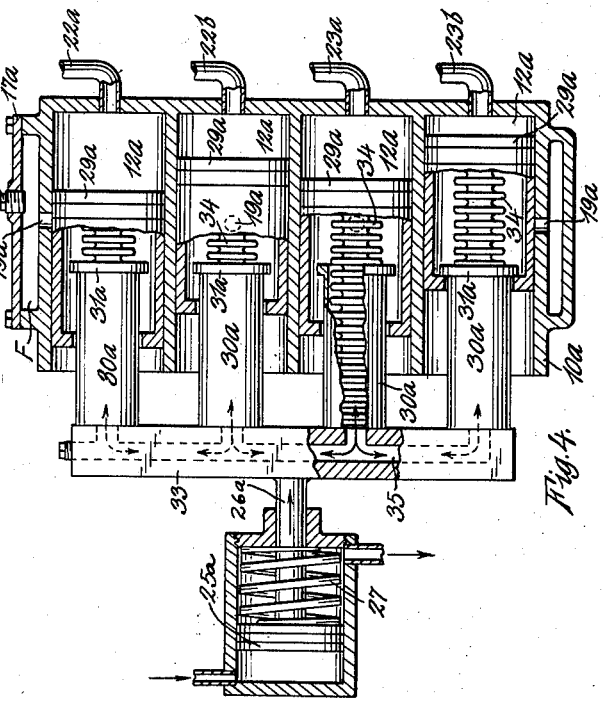
INVENTOR.
Benjamin McInnerney.
BY Martin E. Anderson
ATTORNEY.

Patented May 3, 1938

2,115,995

UNITED STATES PATENT OFFICE 2,115,995

HYDRAULIC BRAKE

Benjamin McInnerney, Omaha, Nebr.

Application September 30, 1937, Serial No. 166,488

14 Claims. (Cl. 60—54.5)

This invention relates to improvements in hydraulic brakes.

The operation of the present day, high speed automobile makes effective brakes an absolute necessity. In order to obtain as nearly as possible perfect equalization of the brake action on the two front wheels and on the two rear wheels as well as proper proportioning of the braking action between the front and the rear wheels, many automobile manufacturers have adopted and are using hydraulic brakes which are well adapted for this purpose. Since hydraulic brakes employ a liquid, such as a light oil, to transmit the required force to the brakes, it sometimes occurs that a conduit, or other part of the mechanism breaks and the liquid leaks out of the system to such an extent that the brakes become inoperative, and unless some special construction is employed which is provided with means for preventing it, all of the brakes become inoperative at the same time, and when this happens very serious accidents may occur.

It is the object of this invention to produce a hydraulic brake mechanism that can readily be applied to any automobile equipped with hydraulic brakes, and which will affect perfect equalization and which, in addition, will prevent the simultaneous failure of all of the brakes when a leak occurs.

Another object is to produce a hydraulic brake operating mechanism of such construction that when it is employed with four wheel brakes and a leak occurs between it and any one of the brakes, only that brake will become inoperative, and the other three brakes will function as before.

A further object of this invention is to produce a brake operating mechanism of such construction that in case of a leak occurring in a conduit to one brake, the mechanism will not discharge all of the pressure liquid but will retain a sufficient amount to permit the other brakes to function.

The above and any other objects that may appear as the description proceeds are attained by means of a construction and an arrangement of parts that will now be described in detail, and for this purpose, reference will be had to the accompanying drawing in which the invention has been illustrated in its present preferred form and in which:

Figure 1 is a section taken on line 1—1 Fig. 2 and illustrates one position of the movable parts by dotted lines;

Figure 2 is a section of the cylinder block, taken on line 2—2 Fig. 1, the pistons having been removed;

Figure 3 is a section, similar to that shown in Fig. 2, and shows a cylinder block having four distributing cylinders, whereas the embodiment illustrated in Figs. 1 and 2 employs two distributing cylinders only;

Figure 4 is a diagrammatic sectional view showing a modified form of the invention; and Figure 5 is a view similar to that shown in Fig. 4 and shows a further modification.

In the drawing the several brakes have not been shown as the invention relates to the operating device only, by means of which the liquid is put under pressure and distributed to the several brakes. Throughout this description it will be assumed that the device is employed for the operation of the four brakes on an automobile, as that is the immediate object.

There is a difference of opinion as to the advisability of employing three brakes and it is argued by some that if one of the front wheel brakes becomes inoperative it is best to depend entirely on the rear wheel brakes and if one rear wheel brake becomes inoperative the other should also become inoperative and the front wheels depended upon solely for braking as it is possible that the unsymmetrical braking action of three wheel brakes may interfere with the proper steering of the automobile. Others hold that it is an advantage to keep as many of the brakes as possible operating.

In Figs. 1 and 2, the invention has been embodied in a device having one distributing cylinder for the two front wheels and another for the two rear wheels; with this embodiment the failure of one brake will make the other brake of the same pair of wheels inoperative. The modifications illustrated in Figs. 3, 4 and 5 have a separate distributing cylinder for each brake.

Referring now more particularly to Figs. 1 and 2, reference numeral 10 denotes a cylinder block having a main or pressure producing cylinder 11 and two distributing cylinders 12. Since there are only two distributing cylinders in the device illustrated in Figs. 1 and 2, the axes of the three cylinders are preferably positioned in a single plane as shown in Fig. 2, but this is not an essential condition. The cylinder block is provided, in addition to the three cylinders, with three liquid storage compartments, A, B and C. Compartment A is separated from compartments B and C by the partition 13 and compartments B and C are separated from each other by partition 14. Both compartments B and C are in communication with compartment A through holes 15 and compartment A is in communication with cylinder 11 through opening 16. Compartments A, B and C are open at the top and are closed by a common cover 17. The cover has a threaded opening that is closed by a screw plug 18 and which may be removed for introducing liquid into chambers A, B and C. Compartments B and C communicate with cylinders 12 through openings 19. The ends of cylinders 12 are closed by a cover 20 that is held in place by means of the bolts 21. Conduits 22 and 23 each connects one of the cylinders 12 with one pair of brakes.

A plunger or piston 24 is mounted for reciprocation in cylinder 11 and is connected with the brake pedal 25 by a connecting rod 26, shown dotted, so that it can be reciprocated by foot pressure applied to the pedal, as shown in Fig. 1, or it may be operated by some fluid pressure device as shown in Fig. 4. A spring 27 serves to retract the piston 24 to the position shown by dotted line 28 so as to uncover opening 16 and bring the interior of the cylinder 11 into communication with chamber A. Positioned in each cylinder 12 is a hollow plunger 29. Each of the hollow plungers is loosely connected with piston 24 by means of rods 30, each of which has a head 31. It will be noted that the inner end walls of plungers 29 have openings 32 that are larger than the rods 30 but smaller than the heads 31. The outer ends of plungers 29 have been shown removable so that the heads 31 may be inserted, but it is possible to effect an introduction of these heads by other means and this construction is merely illustrative of one construction. The length of the rods 30 is such that when the piston 24 is in retracted (dotted line) position, the outer ends of plungers 29 will uncover holes 19. The outer or pressure ends of plungers 29, when in retracted position, have been designated by dotted line 32'. Attention is called at this point to the fact that Fig. 1 is not a true section of Fig. 2, on line 1—1, but has been modified slightly to simplify the drawing.

Normally the several pistons are in the position designated by dotted lines and the several chambers A, B and C are each in communication with a cylinder and with each other; with the parts in this position the apparatus is filled, or nearly filled with pressure liquid.

Let us now assume that the conduits 22 and 23 are each connected with a brake or with a pair of brakes and that the operator applies pressure on pedal 25 sufficient to move it inwardly. Piston 24 will move freely until it covers the hole 16, after which the liquid can no longer escape into compartment A. Any further movement of piston 24 will now force the plungers 29 towards the cylinder end 20, but until the openings 19 are covered, the fluid displaced may flow into compartments B and C. As soon as plungers 29 cover the openings 19 any further movement of the plungers 29 will force liquid through the conduits 22 and 23 to the brakes in the brake drums and the pressure on the liquid will be transmitted to the latter. When the pressure on pedal 25 is released, it will be returned to normal or dotted line position by the action of spring 27. The heads 31 will return the plungers 29 to dotted line position. The cross sectional area of piston 24 may be slightly less than the combined cross sectional areas of plungers 29 so that the latter will travel somewhat slower than the former when moving in a direction to apply the brakes; this permits the plungers to float freely for the purpose of equalizing the pressures in case one brake or set of brakes require more fluid than the other.

In case a slight leakage occurs in the connections there will result a partial vacuum which will be filled with fluid immediately that the openings 16 and 19 are uncovered.

In case one of the conduits 22 or 23 breaks, the liquid escapes quite freely and the liquid in the corresponding cylinder 12 flows out and becomes lost. Under this condition, the corresponding plunger 29 will remain in engagement with the head 31 and the other plunger will lag somewhat until the pressure becomes sufficient to move it and apply pressure to the corresponding brake or pair of brakes. When the pressure on the pedal is released the parts will return to normal (dotted line) position and as soon as holes 19 are uncovered the cylinder communicating with the leaky conduit will be filled with liquid from the supply compartment in communication therewith. Each time that the brake is operated liquid is lost through the leak, but only the one cylinder is affected thereby and therefore one brake or pair of brakes will still function.

The operator can readily determine, from the operation of the brake, that there is a leak and will, of course, take steps to have the breakage repaired.

If each one of the brakes is to be operated by a separate plunger four cylinders 12 are employed in the manner shown in Fig. 3. Each cylinder has a separate supply chamber and the cross section of the plungers 29 may be reduced accordingly. The same reference numerals have been used to indicate the same parts in Figs. 2 and 3 and since the operation is identical and the only change is the addition of two additional cylinders 12 and the supply chambers D and E, no further description will be made of this device.

In Fig. 4 a modification has been shown that differs specifically from the one described but which is broadly the same. In this embodiment four cylinders 12a have been shown in one line, but the cylinders may be arranged in a rectangle the same as in Fig. 3. The cylinder block 10a is surrounded by a fluid compartment or reservoir F whose top is closed by a removable cover 17a provided with a removable plug 18. Compartment F communicates with each of the cylinders 12a through openings 19a. Instead of a single supply compartment F for all of the cylinders, there may be a separate one for each cylinder in the manner shown in Fig. 3. Positioned in each of the cylinders 12a is a plunger 29a that is substantially identical with plungers 29 of Fig. 1. Each cylinder is connected to a brake by means of one of the conduits 22a, 22b, 23a or 23b.

In this embodiment the means employed for moving the plungers and for equalizing the pressures is somewhat different from that already described and will now be described in detail. The brake piston 25a is connected by means of the connecting rod 26a with a hollow cross head 33 having attached to it a plurality of tubular members 30a, each of which has a circular flange or head 31a for engaging the annular end wall of the plunger. Positioned in each of the tubular members 30a is an accordion pleated metal tube 34 of the type sold under the name "sylphon". The outer ends of the "sylphons" are attached to the inner surface of the cross head by a liquid tight joint and the inner ends are closed and normally rest on the bottoms of the plungers. The interiors of the "sylphons" are in communication with the chamber 35 in the cross head and the chamber and the "sylphons" are partially filled with liquid, through an opening that is normally closed by a plug.

Let us now assume that each of the four conduits is connected with a brake and that the compartment F and the cylinders 12a are filled with a liquid. When pressure is applied to the brake piston the cross head 33 moves towards the right and the ends of the "sylphons" engage the bottoms of the cylinders and exert pressure on them tending to move them towards the right. The pistons 29a, which are normally positioned farther to the left than shown, so as to uncover the openings 19a, move freely towards the right until holes 19a are covered and thereafter any further movement must be accompanied by a transfer of liquid through the conduits to the brakes. If one brake requires more liquid than another, the plungers will move the required distance but each of the plungers will exert the same pressure because the pressures are equalized through the cross head and the "sylphons". If one conduit, 23b in the drawing, is broken, the corresponding plunger will move inwardly until stopped by the flange 31a, all as shown in the lower cylinder in Fig. 4. Unless there is a break in one or more of the conduits, all of the plungers float and the pressure is equalized on all of the brakes. When the pressure on the pedal is released, the cross head will be returned by the action of the spring 27 and the parts will move towards the left; the plungers 29a will be retracted by the flanges 31a to a position in which the openings 19a are uncovered. Suitable means is provided to limit the outward movement of the plungers. Any small leakage is replaced by liquid from compartment F. If a serious break occurs the plunger corresponding to the broken conduit will expel a certain amount of liquid at each operation and if a single compartment is used it will finally exhaust the liquid supply, but by providing a separate supply compartment for each cylinder, as in Fig. 3, only the leaky brake will be incapacitated.

In Fig. 5, a further modification has been shown in which the principal difference resides in this that the "sylphons" have been omitted and the flanges 31a of Fig. 4 have been formed into tight fitting pistons 31b. A liquid supply compartment Ab surrounds the cylinder block 10b and openings 16b communicate the interior of each cylinder 12b with the supply compartment Fb. A separate supply compartment, corresponding to compartments B, C, D and E of Fig. 3 is in communication with each cylinder 12b through openings 19b.

Since there may be a slight leakage about pistons 31b, it is necessary to replace this liquid and this is accomplished by providing the hollow pistons, or plungers with openings that are brought into communication with the compartment Fb, through the openings 16b when they are returned to normal or retracted position by means of the spring 25, as shown in connection with the upper piston in Fig. 5.

Fig. 5, as before stated, shows the four cylinders 12b in line, but this is merely for the purpose of making the illustration clearer. Cylinders 12b may, however, be arranged as shown in Fig. 3.

The piston in the upper cylinder of Fig. 5 is shown in normal retracted position and the piston in the lowermost cylinder is in the position it would occupy during operation if the conduit 23b were broken, and the two other pistons are shown in the positions that they would occupy when the brakes are set.

It is clear that the pressure exerted by the 5 pistons will be equalized as long as the chamber 35b and the interiors of plungers 29b are properly filled with liquid. If some accident should occur that would let the fluid out of plungers 29b, the inner ends of pistons 31b would abut the springs 37 and the brakes would still be set, but it would require a greater movement than normal.

When the term "outer end" is used in connection with the pistons, the ends that move forwardly when the brakes are applied is meant.

By properly proportioning the areas of the pistons 29 to the areas of the pistons in the brake drums, the forces may be proportioned in any manner desired.

From the above description it will be apparent that the hydraulic brake operating device, of which three embodiments have been shown, is of simple substantial construction and so designed that if one or more of the conduits break, it will not render the other brakes inoperative. The pressure on the several brakes is equalized by hydraulic means and may be proportioned to apply one set of brakes harder than another set by the simple expedient of changing the cross sectional areas of the plungers. When "sylphons" are used to equalize the pressures, the danger of leakage is reduced to a minimum and in that embodiment no means has been provided for automatically replacing the equalizing fluid.

Having described the invention what is claimed as new is:

1. A pressure distributing and equalizing device for the simultaneous operation of a plurality of hydraulic brakes, comprising in combination, a cylinder block having a plurality of cylindrical openings, a plunger mounted for reciprocation in each opening, means comprising a hydraulic mechanism for simultaneously applying to all of the plungers forces of predetermined proportional values for effecting a movement in a direction to expel a liquid from the cylindrical openings, means forming part of the hydraulic mechanism, connected with the plungers by a lost motion connection, for retracting the plungers, and means for replacing any liquid lost during operation.

2. A pressure distributing and equalizing device for the simultaneous operation of a plurality of hydraulic brakes, comprising in combination, a cylinder block having a plurality of cylindrical openings, a plunger mounted for reciprocation in each opening, means comprising a hydraulic mechanism for simultaneously applying to all of the plungers forces of predetermined proportional values for effecting a movement in a direction to expel a liquid from the cylindrical openings, means actuated by the said hydraulic mechanism for allowing the several plungers to float to a balance while under pressure and for retracting the plungers when pressure is released.

3. A device in accordance with claim 1 in which the cylinder block has a separate liquid supply reservoir for each cylinder, each reservoir communicating with its cylinder through an opening positioned directly in front of the forward end of the plunger when it is in retracted position.

4. A pressure producing, distributing and equalizing device, for the simultaneous operation of a plurality of hydraulic brakes, comprising in combination, a cylinder block having a plurality of cylindrical openings closed at one end, a hollow plunger mounted for reciprocation in each of the cylinders, a hydraulic pressure producing and force proportioning device operatively associated with all of the plungers for simultaneously applying to all of them forces of predetermined proportional values to move them towards the closed ends of the cylinders, the hydraulic device having a separate retracting element for each of the plungers, a lost motion connection between each retracting device and its plunger, and means for reciprocating the hydraulic device whereby the plungers will be moved towards the closed ends of the cylinders and then retracted to a predetermined position, the cylinder block having a separate liquid supply reservoir in communication with each cylinder through an opening positioned directly in front of the retracted position of the associated plunger whereby any liquid lost during the operation of the brake will be automatically replaced.

5. A pressure producing, distributing and force proportioning device, for the simultaneous operations of a plurality of hydraulic brakes, comprising in combination, a cylinder block having a main cylinder and a plurality of auxiliary cylinders symmetrically arranged about the axis of the main cylinder, the several cylinders being in communication, a piston mounted for reciprocation in the main cylinder, a plunger mounted for reciprocation in each of the auxiliary cylinders, the space between the piston and the plungers containing a liquid for the transmission of pressure, the outer ends of the auxiliary cylinders being closed, the cylinder spaces between the plungers and the end closure being each connected to a hydraulic brake by means of a conduit, means for interconnecting the piston in the main cylinder with each of the plungers, for retracting all of the plungers to a predetermined position, said means comprising a lost motion connection, the cylinder block having a separate liquid supply compartment for each cylinder, each compartment communicating with its cylinder through an opening positioned directly in front of the corresponding piston or plunger when in its retracted position.

6. A pressure producing, distributing and force proportioning device, for the simultaneous operations of a plurality of hydraulic brakes, comprising in combination, a cylinder block having a main cylinder and a plurality of auxiliary cylinders symmetrically arranged about the axis of the main cylinder, the several cylinders being in communication, a piston mounted for reciprocation in the main cylinder, a plunger mounted for reciprocation in each of the auxiliary cylinders, the space between the piston and the plungers containing a liquid for the transmission of pressure, the outer ends of the auxiliary cylinders being closed, the cylinder spaces between the plungers and the end closure being each connected to a hydraulic brake by means of a conduit, the plungers having axial openings, means comprising headed members carried by the pistons and projecting into the openings in the plungers to effect their simultaneous retraction, said headed members being free to move forwardly into the plungers but limited in their reverse movement by stop means engaging the heads, the cylinder block having a separate liquid supply compartment for each cylinder, each compartment communicating with its cylinder through openings positioned directly in front of the piston or plungers when in retracted position.

7. A pressure producing, distributing and force proportioning device, for the simultaneous operations of a plurality of hydraulic brakes, comprising in combination, a cylinder block having a main cylinder and a plurality of auxiliary cylinders symmetrically arranged about the axis of the main cylinder, the several cylinders being in communication, a piston mounted for reciprocation in the main cylinder, a plunger mounted for reciprocation in each of the auxiliary cylinders, the space between the piston and the plungers containing a liquid for the transmission of pressure, the outer ends of the auxiliary cylinders being closed, the cylinder spaces between the plungers and the end closure being each connected to a hydraulic brake by means of a conduit, the plungers having axial openings, means comprising headed members, carried by the pistons and projecting into the openings in the plungers to effect their simultaneous retraction, said headed members being free to move forwardly into the plungers but limited in their reverse movement by stop means engaging the heads, the cylinder block having a separate liquid supply compartment for each cylinder, each compartment communicating with its cylinder through openings positioned directly in front of the piston or plungers when in retracted position, the several compartments being in communication near their tops to facilitate filling.

8. A pressure producing, distributing and force proportioning device, for the simultaneous operation of a plurality of hydraulic brakes, comprising in combination, a cylinder block having a plurality of separate parallel cylinders, closed at one end, a hollow plunger mounted for reciprocation in each cylinder, the interiors of the plungers forming cylinders, a piston associated with the cylinder in each plunger, means forming stops for preventing the withdrawal of the pistons from the plungers, a hollow piston rod connected with each piston, a hollow cross head to which all of the piston rods are connected, and the interior of which is in communication with the interiors of the several plungers through the hollow piston rods, means for reciprocating the cross head relative to the cylinder block, the compartment in the cross head and the chambers in communication therewith containing a quantity of liquid for transmitting force from the cross head to the plungers, the cylinders in front of the plungers being filled with fluid, and means comprising tubular conduits for transmitting liquid from each cylinder to a hydraulic brake.

9. A pressure producing, distributing and force proportioning device, for the simultaneous operation of a plurality of hydraulic brakes, comprising in combination, a cylinder block having a plurality of separate parallel cylinders, closed at one end, a hollow plunger mounted for reciprocation in each cylinder, the interiors of the plungers forming cylinders, a piston associated with the cylinder in each plunger, means forming stops for preventing the withdrawal of the pistons from the plungers, a hollow piston rod connected with each piston, a hollow cross head to which all of the piston rods are connected, and the interior of which is in communication with the interiors of the several plungers through the hollow piston rods, means for reciprocating the cross head relative to the cylinder block, the compartment in the cross head and the chambers in communication therewith containing a quantity of liquid for transmitting force from the cross head to the plungers, the cylinder spaces in front of the plungers being filled with fluid, the cylinder block having a separate liquid supply compartment in communication with each cylinder through an opening positioned directly in front of the retracted positions of the plungers, the cylinder block having another liquid supply compartment for replacing liquid lost from the cross head and communicating compartments, the plungers and the cylinder walls of the cylinder block having openings that are brought into register when the plungers are retracted, and a conduit connecting each cylinder with a hydraulic brake.

10. A pressure producing, distributing and force proportioning device, for the simultaneous operation of a plurality of hydraulic brakes comprising in combination, a cylinder block having a plurality of separate parallel cylinders, closed at one end, a hollow plunger mounted for reciprocation in each cylinder, the interiors of the plungers forming cylinders, a piston associated with the cylinder in each plunger, means forming stops for preventing the withdrawal of the pistons from the plungers, a hollow piston rod connected with each piston, a hollow cross head to which all of the piston rods are connected, and the interior of which is in communication with the interiors of the several plungers through the hollow piston rods, means for reciprocating the cross head relative to the cylinder block, the compartment in the cross head and the chambers in communication therewith containing a quantity of liquid for transmitting force from the cross head to the plungers, the cylinders in front of the plungers being filled with a liquid, the cylinder block having a separate liquid supply compartment in communication with each cylinder through an opening positioned directly in front of the retracted positions of the plungers, the cylinder block having another liquid supply compartment for replacing liquid lost from the cross head and communicating compartments, the plungers and the cylinder walls of the cylinder block having openings that are brought into register when the plungers are retracted, the several liquid supply compartments being connected near their tops for convenience in filling.

11. A device in accordance with claim 1 in which the hydraulic mechanism is provided with a sylphon for each of the plungers which serves as means for applying forces to the plungers.

12. A device in accordance with claim 4 in which the hydraulic pressure producing and force proportioning device is provided with "sylphons" that communicate the forces to the plungers, the interiors of the sylphons being in communication and contain a liquid.

13. A device in accordance with claim 8 in which the pistons that cooperate with and transmit force to the plungers have been replaced by "sylphons".

14. A pressure producing, distributing and force proportioning device, for the simultaneous operation of a plurality of hydraulic brakes, comprising in combination, a cylinder block having a plurality of separate parallel cylinders, closed at one end, a hollow plunger mounted for reciprocation in each cylinder, a hollow cross head mounted for movement relative to the cylinder block, a "sylphon" operatively associated with each plunger and secured to the cross head, the interiors of the "sylphons" being all in communication with the interior of the cross head, the cross head and the "sylphons" containing a liquid, means carried by the cross head and connected with the plungers with a lost motion connection for simultaneously retracting all of the plungers, means for reciprocating the cross head, the cylinders in front of the plungers being filled with a pressure liquid, and conduits connecting each cylinder with a brake.

BENJAMIN McINNERNEY.